United States Patent
Del Castillo et al.

[19]
[11] Patent Number: 6,032,548
[45] Date of Patent: Mar. 7, 2000

[54] SYSTEM AND METHOD FOR CREATING MOVEMENT UTILIZING A SERVO MECHANISM WITH A SELF-ALIGNING CLUTCH

[76] Inventors: Leonardo Del Castillo, 13712 176th Ave. NE., Redmond, Wash. 98052; Donald Charles Grome, 847 Main St., Edmonds, Wash. 98020; Jeffery Mark Reents, 1055 Avery Creek Dr., Woodstock, Ga. 30188; Harjit Singh, 10526 157th Ave. NE., Redmond, Wash. 98052

[21] Appl. No.: 08/907,473

[22] Filed: Aug. 8, 1997

[51] Int. Cl.$^7$ ................................ F16H 29/00; B25J 9/00
[52] U.S. Cl. ................................ 74/89.19; 464/57; 901/9
[58] Field of Search ................................ 464/57; 901/9, 901/11, 23, 25; 192/55.2, 55.5; 16/285; 74/490.03, 435, 89.19

[56] References Cited

U.S. PATENT DOCUMENTS

| | | | |
|---|---|---|---|
| 2,336,307 | 12/1943 | Slye | 464/57 |
| 3,117,771 | 1/1964 | Herr et al. | 464/57 X |
| 3,726,370 | 4/1973 | Hubbard | 192/223.4 |
| 4,207,704 | 6/1980 | Akiyama . | |
| 4,660,033 | 4/1987 | Brandt . | |
| 4,744,450 | 5/1988 | Bertin et al. | 192/84.6 X |
| 4,807,031 | 2/1989 | Broughton et al. . | |
| 4,840,602 | 6/1989 | Rose . | |
| 4,846,693 | 7/1989 | Baer . | |
| 4,847,699 | 7/1989 | Freeman . | |
| 4,847,700 | 7/1989 | Freeman . | |
| 4,852,419 | 8/1989 | Kittel et al. | 192/89.14 |
| 4,864,607 | 9/1989 | Mitamura et al. . | |
| 4,930,019 | 5/1990 | Chu . | |
| 4,949,327 | 8/1990 | Forsse et al. . | |
| 5,021,878 | 6/1991 | Lang . | |
| 5,086,900 | 2/1992 | Kikuta et al. | 464/57 X |
| 5,108,341 | 4/1992 | DeSmet . | |
| 5,198,893 | 3/1993 | Lang . | |
| 5,239,246 | 8/1993 | Kim | 901/9 X |
| 5,270,480 | 12/1993 | Hikawa . | |
| 5,389,040 | 2/1995 | Kakimi | 464/57 |
| 5,515,748 | 5/1996 | Yagi | 74/490.11 X |

FOREIGN PATENT DOCUMENTS

WO91/10490  7/1991  WIPO .

*Primary Examiner*—Rodney H. Bonck

[57] ABSTRACT

A system for providing self-alignment of an appendage or other movable part comprising an input device, a self-aligning clutch, a processor, a feedback sensor, and a timer. The input device drives a set of gears including a partial output gear. The self-aligning clutch is coupled to the output gear and moves the appendage in response to the rotational motion of the output gear. The self-aligning clutch includes a flexible link for transferring energy from the output gear to the appendage and for maintaining the relative alignment between the appendage and the output gear. When an obstruction prevents the appendage from moving to the desired position, the flexible link stores energy. After the obstruction is removed, the flexible link releases the stored energy to move the appendage so that the relative alignment between the output gear and the appendage is maintained. The self-aligning clutch prevents damage to the servo when an external force is applied to the appendage. The feedback sensor monitors the position of the output gear and provides the current position of the output gear. The processor controls power to the input device and calculates the difference between the current position and the desired position of the output gear. The processor provides a timer value to a timer based on the calculation performed by the processor. If the timer value expires before the output gear has moved to the desired position, the processor terminates power to the input device.

6 Claims, 10 Drawing Sheets

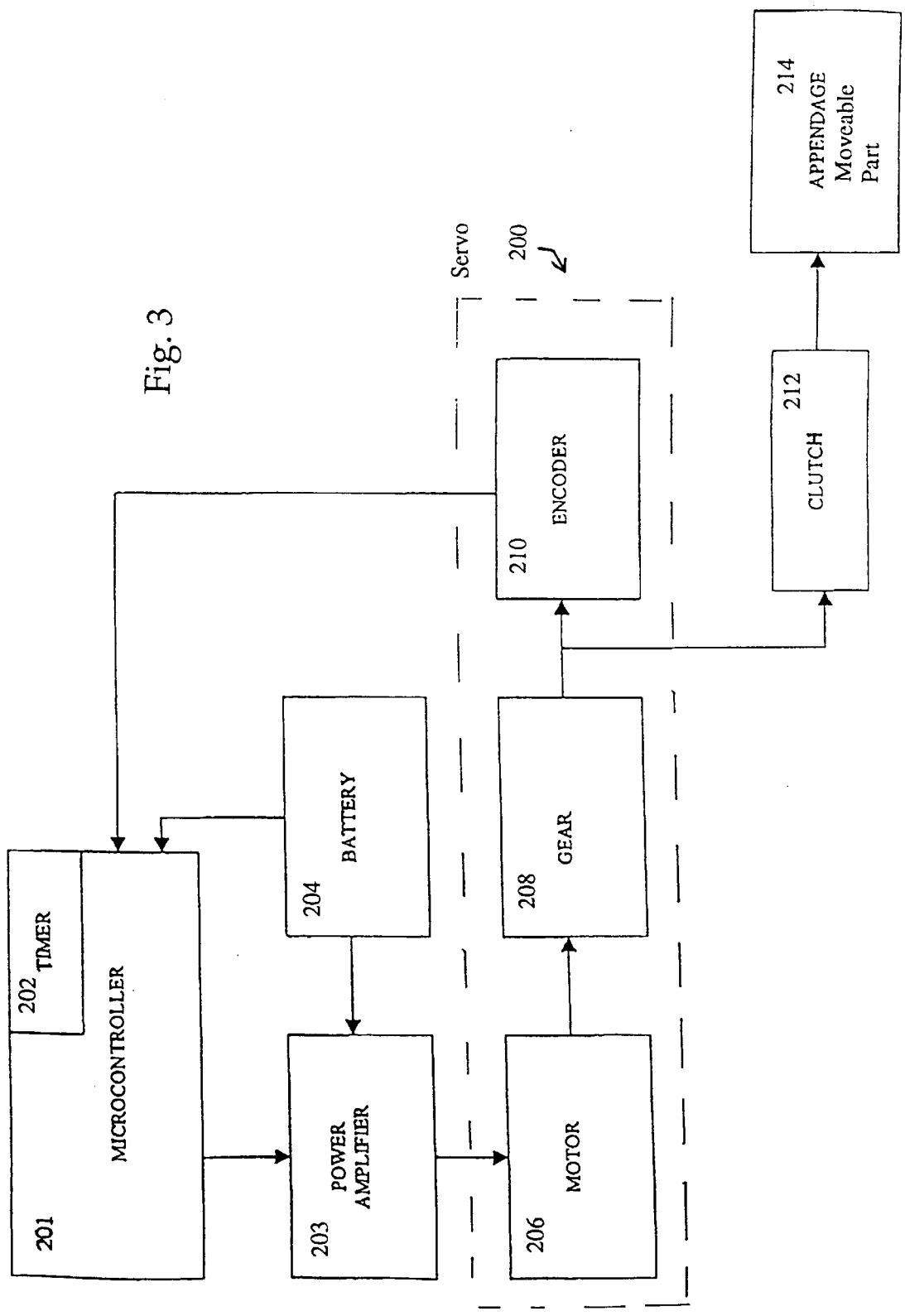

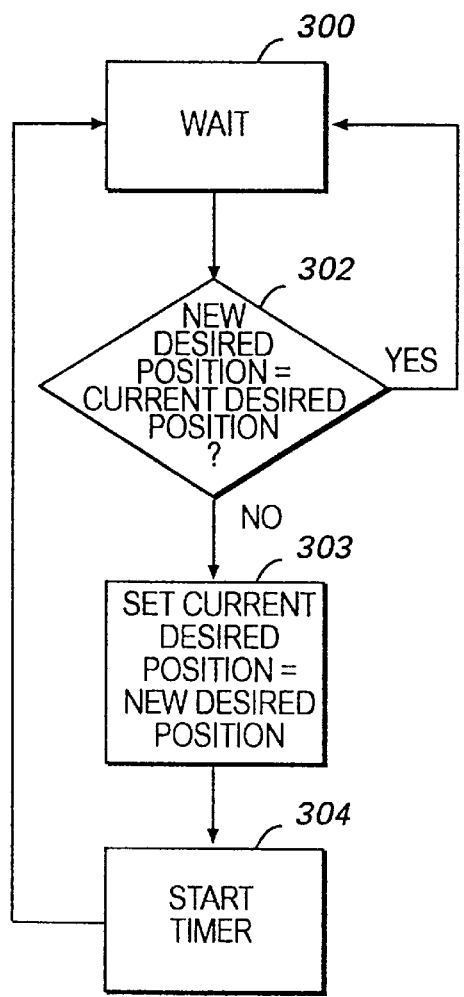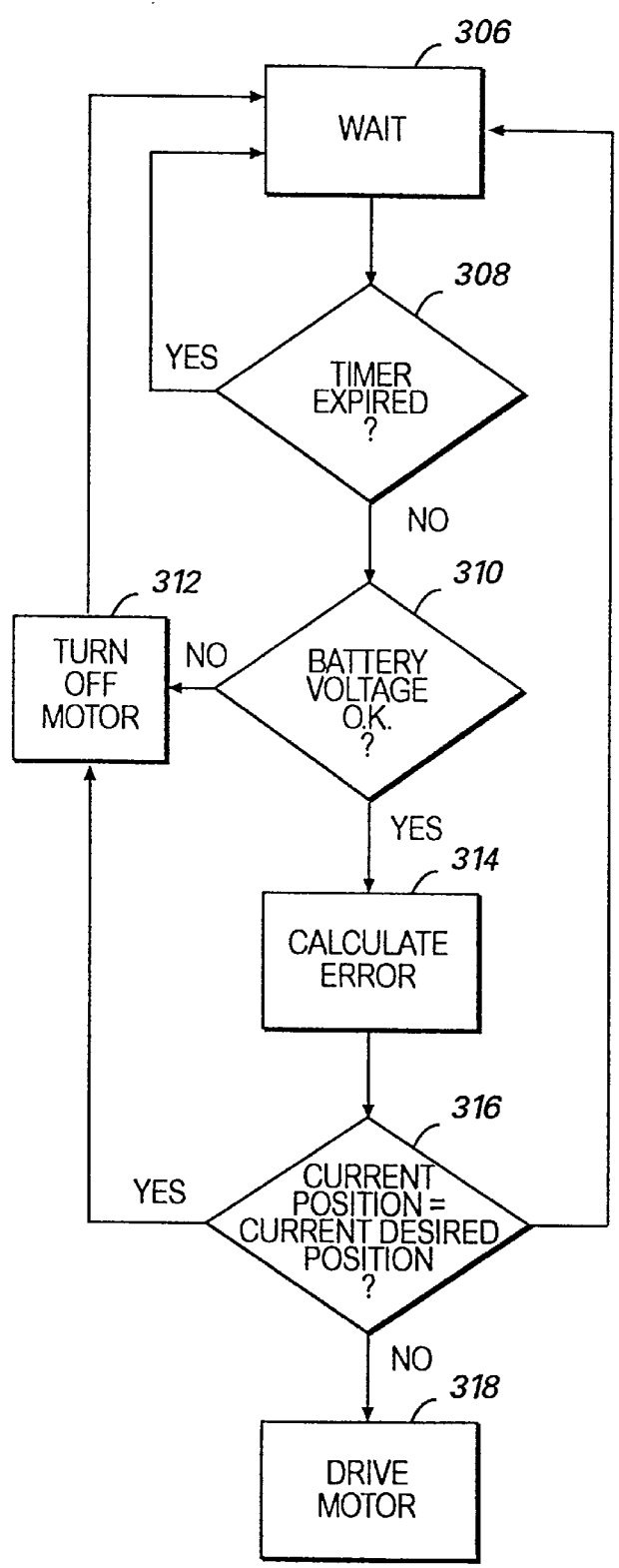
FIG.4a  FIG.4b

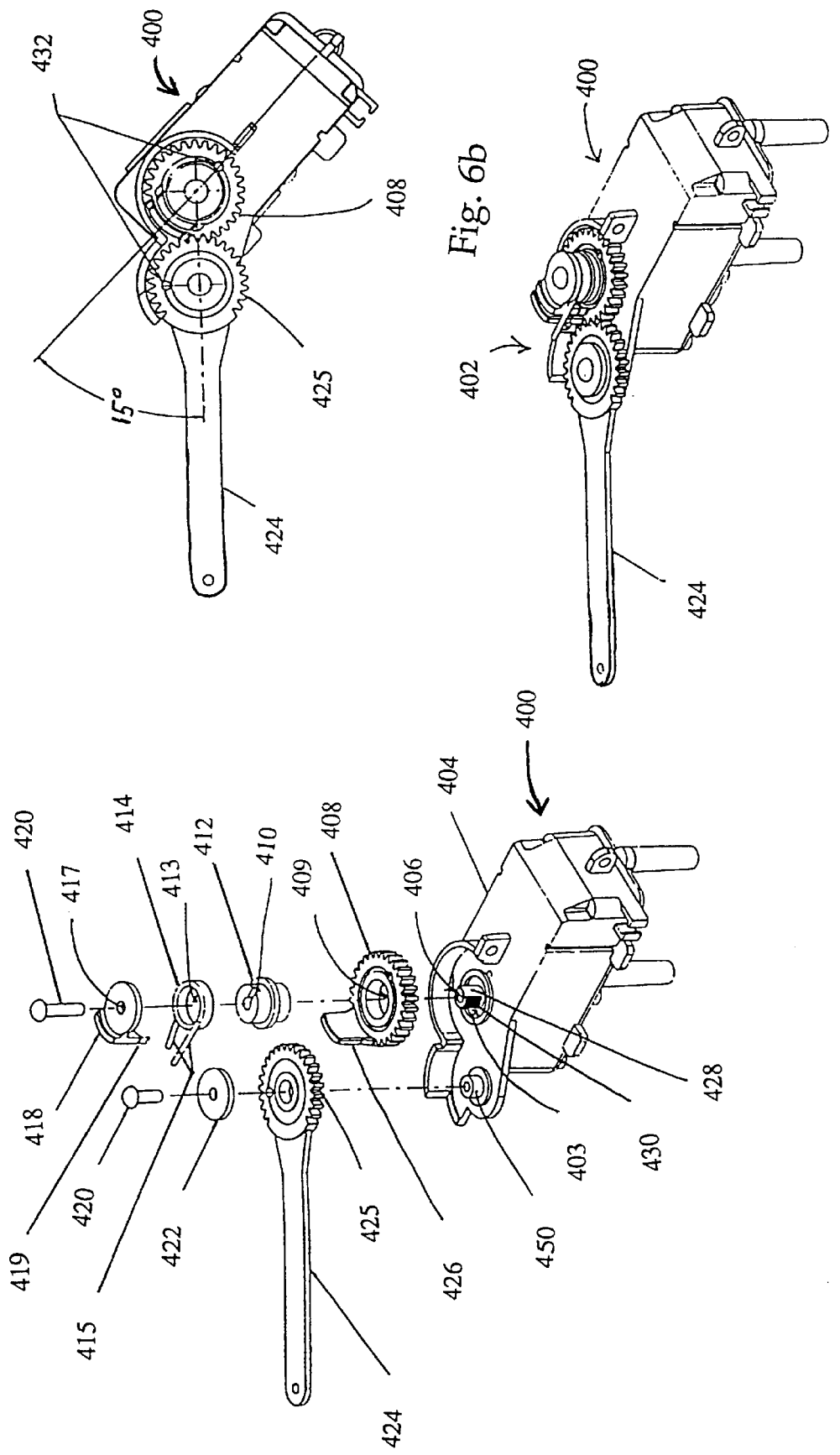

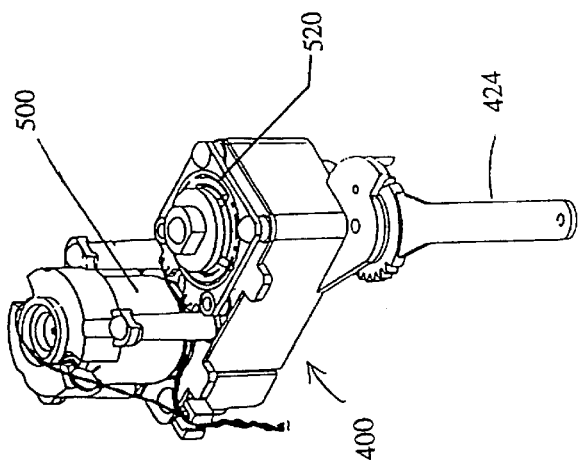
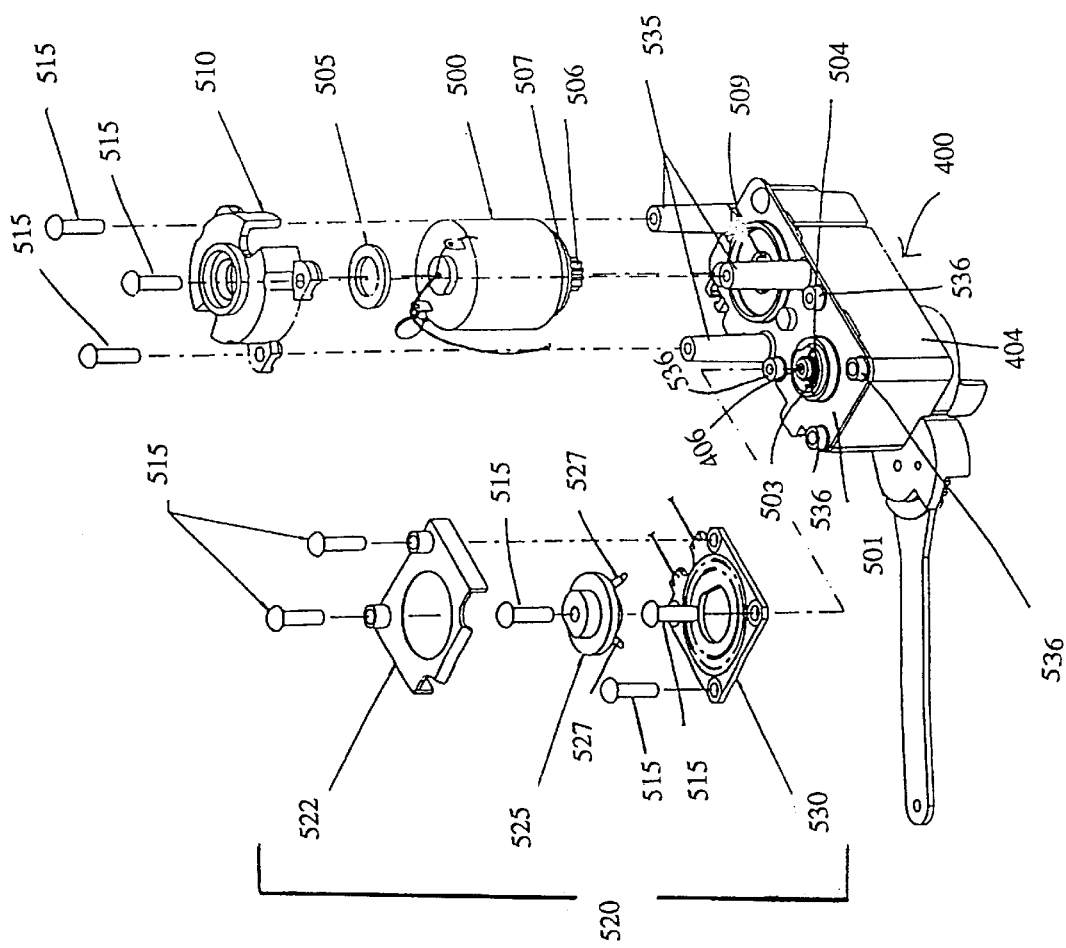

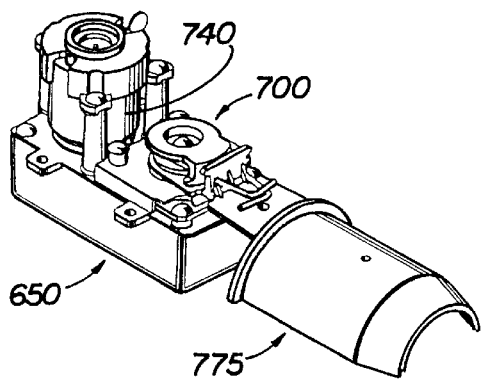
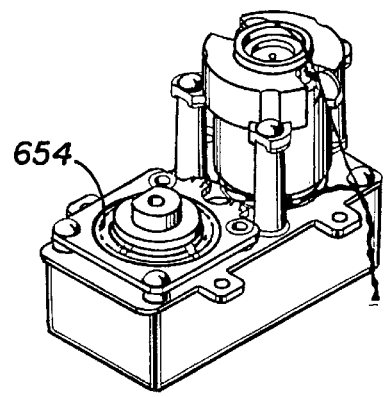
FIG 10a  FIG 10b
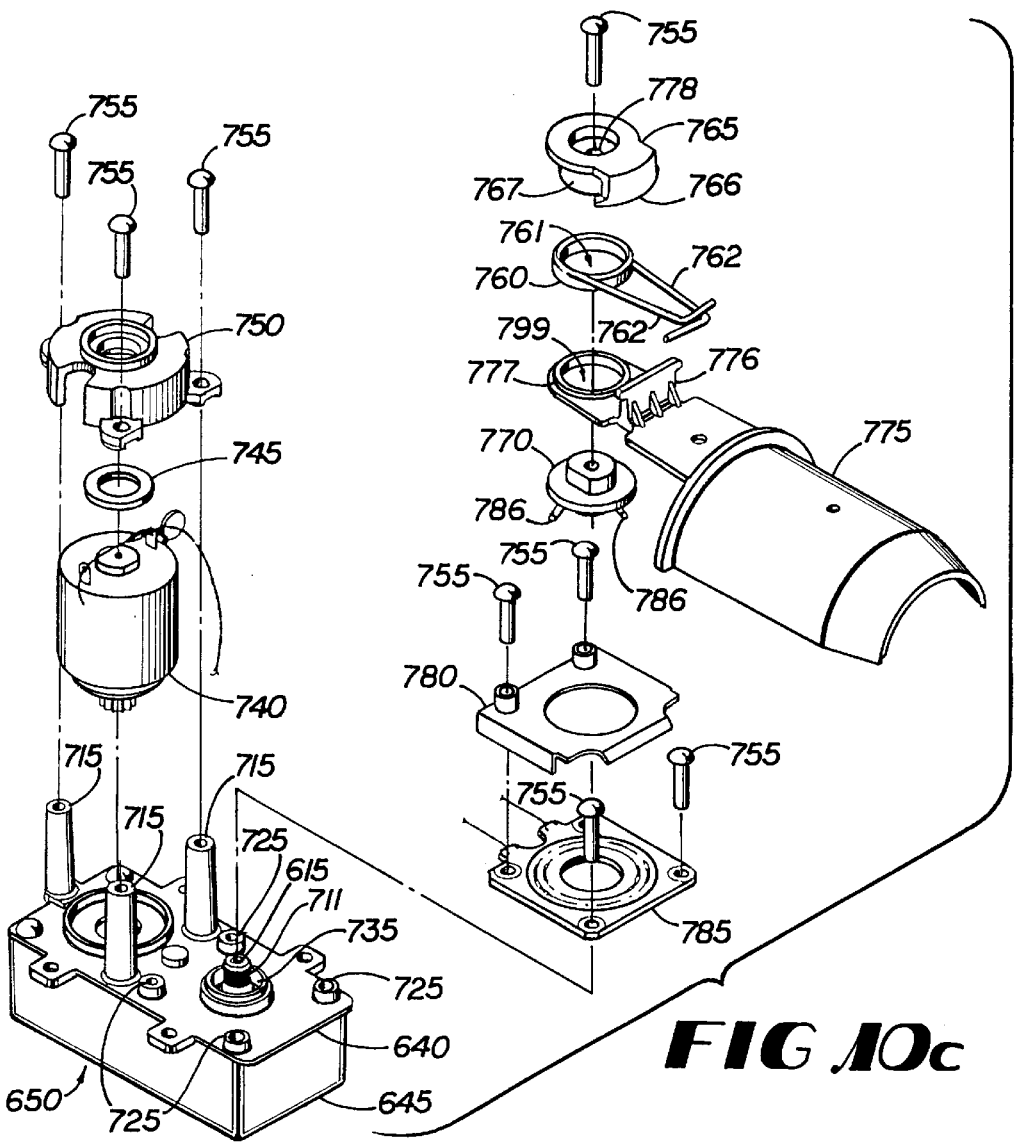
FIG 10c

SYSTEM AND METHOD FOR CREATING
MOVEMENT UTILIZING A SERVO
MECHANISM WITH A SELF-ALIGNING
CLUTCH

REFERENCE TO RELATED APPLICATIONS

This application is related to U.S. application Ser. No. 08/795,710 entitled "PROTOCOL FOR A WIRELESS CONTROL SYSTEM" filed on Feb. 4, 1997; U.S. application Ser. No. 08/794,921 entitled "A SYSTEM AND METHOD FOR CONTROLLING A REMOTE DEVICE" filed on Feb. 4, 1997; U.S. application Ser. No. 08/795,698 entitled "SYSTEM AND METHOD FOR SUBSTITUTING AN ANIMATED CHARACTER WHEN A REMOTE CONTROL PHYSICAL CHARACTER IS UNAVAILABLE" filed on Feb. 4, 1997; and U.S. application Ser. No. 08/795,711 entitled "METHOD AND SYSTEM FOR DETERMINING LIP POSITION AND MOUTH OPENING OF AN ANIMATED CHARACTER" filed on Feb. 4, 1997; all assigned to a common assignee.

TECHNICAL FIELD

The present invention relates to animated electronic toys and, more particularly, relates to an animated electronic character capable of creating life-like gestures using a servo mechanism with a self-aligning clutch.

BACKGROUND OF THE INVENTION

A variety of consumer products available today rely upon the use of wireless communication. Microsoft Corporation has developed a product called "ACTIMATES BARNEY," which is an educational computer product for young children. The "ACTIMATES BARNEY" product includes animated educational programs and animated electronic characters that move and speak. The animated electronic characters are capable of receiving control data and speech data from a control system and responding by sending status and sensor data to the control system. When the child is using the program, an animated electronic character "comes to life" and interacts with the user and with characters that are displayed on a display device. The animated electronic character acts as a guide or friend to the child and provides assistance, encouragement, and guidance as the child uses the program. The animated electronic character moves and speaks in response to signals that are retrieved from the educational program's storage medium and transmitted to the animated electronic character. The animated electronic character also includes various sensors for receiving input signals from the child.

Because the child physically interacts with the animated electronic character, the character can easily be mishandled resulting in the mechanical and electrical components being damaged. Mishandling may also be in the form of external forces being applied to an appendage or other movable part such as the character's arms, legs, eyes, or head. For example, the child may block or forcibly move the appendage while a motor is trying to move it. If the force is large enough, the appendage may break. In addition, the child may drop or toss the character, which can likely damage the servos within the character.

Some prior art devices address the problem of external forces by employing slipping mechanisms. Specifically, if the child blocks the moving appendage, the appendage slips relative to the motor. Such slipping mechanisms include a rubber band between a servo and an output shaft of a motor or a clutching device with a mechanical slipping disk similar to those used in a cassette player. In addition, some devices use a belt and pulley system, which is another type of slipping mechanism. One disadvantage of using slipping mechanisms is when the appendage slips, synchronization is lost between the appendage and the motor. Thus, the appendage is unable to reposition itself or move to the originally desired position.

Generally, these devices may have some type of indexing feature, such as a hole in a gear, to electronically determine the relative position of the appendage. However, if the appendage slips, the electronics can detect the slippage, but there is no mechanical mechanism to correct the slippage. These devices do not have a self-alignment feature. To provide such a feature can be expensive, complex, and difficult to manufacture.

In addition, in battery-operated devices, typically, there is no feature to control the power to the device should the child obstruct the appendage. Power is continually supplied as the appendage tries to move to the desired position regardless of whether there is an external force preventing it from doing so. Hence, batteries are likely to run down quickly, thereby requiring replacement on a frequent basis.

Therefore, there is a need to provide an animated electronic toy that is robust and able to withstand repeated mishandling. There is also a need to provide an animated electronic toy that is able to withstand external forces regardless of whether the animated electronic toy is trying to articulate or move an appendage or other movable part. In addition, there is a need to provide a self-alignment feature for an appendage or movable part to prevent damage to the servo when an external force is applied to the appendage or movable part. There is also a need to provide a self-alignment feature for an appendage or movable part so that when external forces are applied to the appendage or movable part, the appendage or movable part is able to move to the position that it would have moved to if the external force was never applied. Furthermore, there is a need to provide a power management feature to conserve power consumption when an obstruction is present. There is a further need to provide a design that provides these capabilities while being easy to manufacture. Finally, although the technology and capabilities of an animated electronic toy such as this are quite complex and sophisticated, there is a need to provide these capabilities at a low cost.

SUMMARY OF THE INVENTION

The present invention solves the above-described needs by providing an apparatus for providing self-alignment of a movable part, such as an appendage, neck, eye, and so forth. The apparatus is comprised of an input device and a self-aligning clutch. The input device, such as a motor, drives a set of gears including an output gear. The set of gears is coupled to the input device for providing gear reduction. The self-aligning clutch is coupled to the output gear and serves the purpose of moving the movable part in response to the rotational motion of the output gear. The self-aligning clutch includes a flexible link, such as a spring, for transferring energy from the output gear to the movable part and for maintaining the relative alignment between the movable part and the output gear. The flexible link stores energy if the movable part is obstructed and releases the stored energy after the obstruction is removed, thereby moving the movable part so that it is aligned with the output gear.

The present invention may also include a feedback sensor and a processor. The feedback sensor is coupled to the input device and the processor and serves the dual purpose of monitoring the position of the output gear and providing the position of the output gear to the processor.

Another aspect of the present invention includes a method for reducing the power consumption of a motor operated by a power source and used to move a movable part by controlling the power to the motor. In connection with this aspect of the present invention, a first control signal for movement of the movable part from a current desired position to a new desired position within a predetermined time period is detected. Next, a determination is made as to whether the new desired position is different from the current desired position. A second determination is made as to whether the voltage level of the power source used to power the motor is below a specific threshold. If the new desired position is different from the current desired position and the voltage level of the power source is not below the specific threshold, the motor is powered. In the event that either the movable part reaches the current desired position, the predetermined time period expires, or the voltage of the power source is below the specific threshold, the power to the motor is terminated. The entire process can be repeated for each additional control signal after the first control signal.

More particularly described with respect to this aspect of the present invention, the current position of the movable part is monitored and compared to the current desired position. Next, a determination is made as to whether the current position is the same as the current desired position before performing the step of terminating the power to the motor.

In another aspect of the present invention, there is provided a system for providing self-alignment of a movable part. This system comprises an input device, a self-aligning clutch, a processor, a feedback sensor, and a timer. The input device, such as a motor, drives a set of gears including an output gear. The set of gears is coupled to the input device for providing gear reduction. The self-aligning clutch is coupled to the output gear and moves the movable part in response to the rotational motion of the output gear. The self-aligning clutch includes a flexible link, such as a spring, for transferring energy from the output gear to the movable part and for maintaining the relative alignment between the movable part and the output gear. The processor is functionally connected to the input device and controls power to the input device if a current position of the output gear is different from a desired position of the output gear. The feedback sensor monitors the position of the output gear. The feedback sensor is also functionally connected to the processor and provides the current position of the output gear. The processor is further operative to calculate the difference between the current position of the output gear provided by the feedback sensor and the desired position of the output gear, which is provided by the processor. The timer provides a timer value based on the calculation performed by the processor. If the timer value expires before the output gear has moved to the desired position, the processor terminates power to the input device.

When an obstruction exists preventing the movable part from moving to the desired position, the flexible link stores energy. After the obstruction is removed, the flexible link releases the stored energy to move the movable part so that the relative alignment between the output gear and the movable part is maintained.

Advantageously, the present invention provides an animated electronic toy that is robust and able to withstand repeated mishandling. The present invention also provides an animated electronic toy that is able to withstand external forces regardless of whether the animated electronic toy is trying to articulate or move an appendage or other movable part. The present invention also provides a self-alignment feature for an appendage or movable part to prevent damage to the servo when an external force is applied to the appendage or movable part. In addition, the present invention provides a self-alignment feature for an appendage or movable part so that when external forces are applied to the appendage or movable part, the appendage or movable part is able to move to the position that it would have moved to if the external force was never applied. Furthermore, the present invention provides a power management feature to conserve power consumption when an obstruction is present. The present invention further provides a design that is easy to manufacture. Finally, although the technology and capabilities of an animated electronic toy such as this are quite complex and sophisticated, the present invention provides these capabilities at a low cost.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 3 is a block diagram illustrating an operation for moving an appendage or movable part in accordance with an exemplary embodiment of the present invention.

FIG. 4, consisting of FIGS. 4a and 4b, are flow diagrams illustrating an exemplary process for managing power in accordance with an exemplary embodiment of the present invention.

FIG. 6, consisting of FIGS. 6a–6c, illustrates various views of a right arm of an animated electronic character in accordance with an exemplary embodiment of the present invention.

FIG. 8, consisting of FIGS. 8a and 8b, illustrates the commutator side or bottom view of a servo assembly in accordance with an exemplary embodiment of the present invention.

FIG. 10, consisting of FIGS. 10a–10c, illustrates various views of a neck of an animated electronic character in accordance with an alternative embodiment of the present invention.

DETAILED DESCRIPTION

Figure 1:
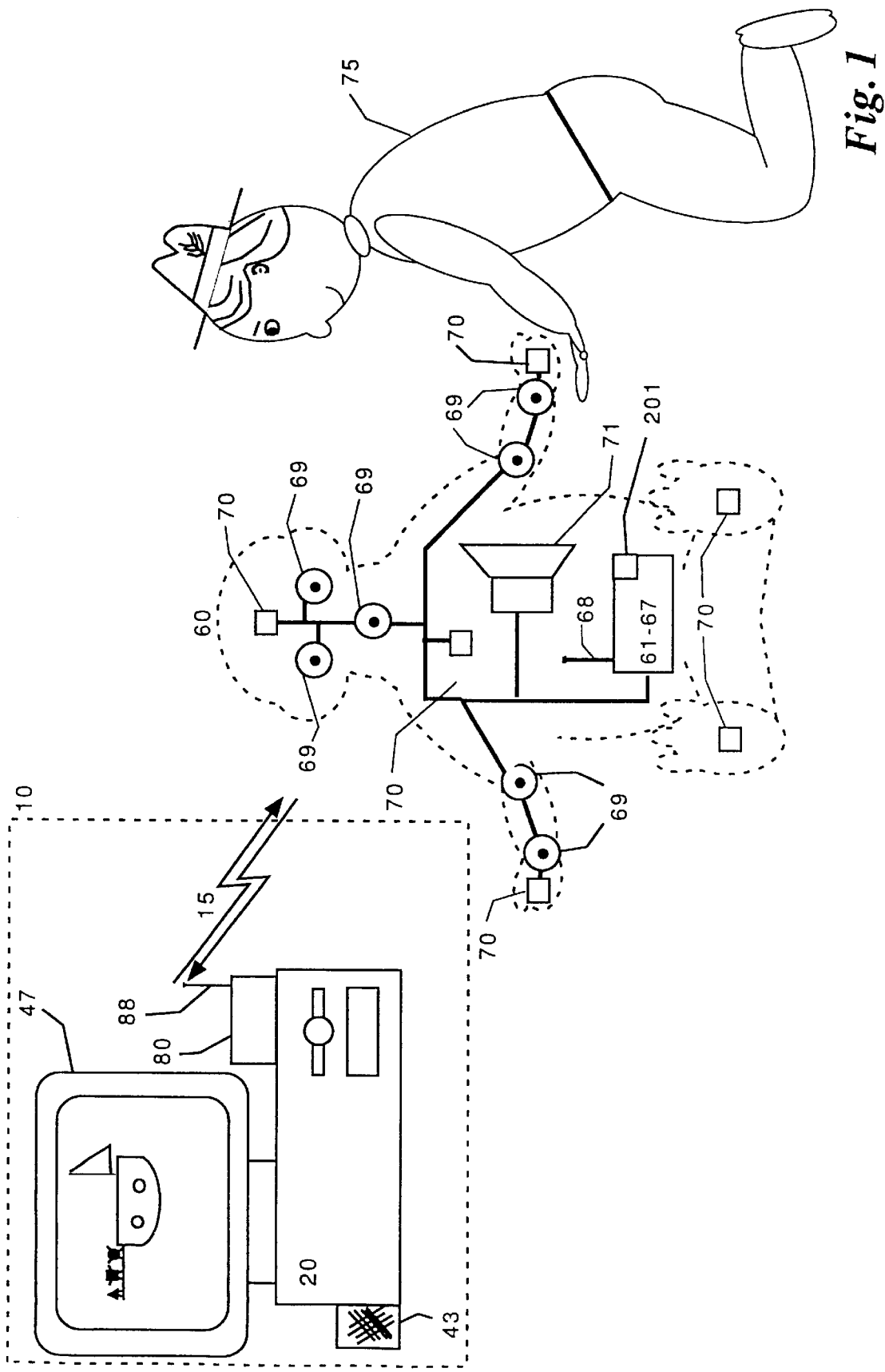
FIG. 1 is a diagram illustrating an exemplary system that includes a personal computer, a wireless modem, and an animated electronic character.

The present invention is directed toward a system and method for creating life-like gestures in an animated electronic character by driving appendages, specifically, the arms and legs, and other movable parts, such as the neck, eyes, hands, feet, and so forth, of the animated electronic character using a servo mechanism and a self-aligning clutch. In one embodiment, the invention is incorporated into the "ACTIMATES BARNEY" product, which is produced by Microsoft Corporation of Redmond, Wash. Briefly described, the "ACTIMATES BARNEY" product is an interactive system that controls the operation of one or more animated electronic characters while providing an audio/video presentation on an audio/video display. Specifically, data is transmitted to the animated electronic characters over a communication link. Upon receiving the data, the animated electronic characters move and talk in a manner dictated by the content of the received data. By transmitting the appropriate data to the animated electronic characters, the animated electronic characters will move and talk as though they are an extension of the audio/video presentation.

Referring now to the drawings, in which like numerals represent like elements throughout the several figures, aspects of the present invention and exemplary operating environments will be described.

EXEMPLARY OPERATING ENVIRONMENT

Turning to FIG. 1, aspects of the present invention are described within the context of a system that includes a master device, which communicates with and controls one or more slave devices through a radio frequency (RF) communication channel. More specifically, aspects of the present invention are particularly applicable within a "realmation" system to which the "ACTIMATES BARNEY" product belongs. "Realmation," derived from combining the words "realistic" and "animation," is descriptive of a new technology that Microsoft Corporation of Redmond Washington is developing. An example of a realmation system includes a master device, such as a computer system with a display, which communicates with and controls one or more slave devices, such as animated electronic characters. The master device provides scenes of an animated audio/video presentation on the display while simultaneously transmitting control and speech data to one or more animated electronic characters. The animated electronic characters, in response to receiving the control and speech data, move and talk in context with the animated audio/video presentation.

The realmation product includes two main components: a Realmation Control System 10 acting as the master device, and one or more Realmation Performers 60 acting as slave devices. The Realmation Performers 60 may include a variety of devices that are useful for industrial, educational, research, entertainment or other similar purposes. Each Realmation Performer 60 includes an RF transceiver system for receiving, demodulating, and decoding signals originating from the Realmation Control System 10. The signals originating from the Realmation Control System 10 contain control and speech data. The RF transceiver within each Realmation Performer may also encode, modulate and transmit response signals to the Realmation Control System. These transmitted response signals provide the Realmation Control System with status information concerning the Realmation Performers. Specifically, the process of transmitting the realmation data includes encoding the realmation data, modulating a carrier with the encoded realmation data, and emitting the modulated carrier as an RF signal from antenna 88 over RF communication channel 15. The Realmation Performer 60 receives the RF signals from the Realmation Control System at antenna 68.

The Realmation Control System 10 governs the operation of one or more Realmation Performers 60 while displaying an animated audio/video presentation. The Realmation Control System 10 includes a realmation data source 20, a Realmation Link Master 80, and a display system 47. The realmation data source 20 may be an active device, such as a computer system, that controls the Realmation Link Master 80, as well as provides the input of realmation data. Alternatively, the realmation data source may be a passive device, such as a computer, VCR or TV tuner, that feeds realmation data to the Realmation Link Master. Another alternative includes combining the realmation data source with the Realmation Link Master to form a "smart" Realmation Link Master. Regardless of the configuration, the realmation data source provides the input of realmation data, and the Realmation Link Master transmits the realmation data to one or more Realmation Performers.

The main function of the Realmation Link Master 80 is to receive realmation data from the realmation data source, encode the realmation data, and transmit the encoded realmation data to one or more Realmation Performers. In addition, the Realmation Link Master may receive response signals from the Realmation Performers and decode the response signals to recover realmation data.

Two exemplary embodiments of a realmation product include a simplex embodiment and a duplex embodiment. Exemplary embodiments of the Realmation Control System, the Realmation Link Master and the Realmation Performers will be generally described in the context of programs running on microprocessor-based computer systems. Those skilled in the art will recognize that implementations of the present invention may include various types of program modules, use various programming languages, and be operable with various types of computing equipment. Additionally, although the descriptions of exemplary embodiments portray the Realmation Control System as controlling a Realmation Performer over an RF communication channel, those skilled in the art will appreciate that substitutions to the RF communication channel can include other communication mediums such as fiber optic links, copper wires, infrared signals, etc.

Generally, a program, as defined herein, includes routines, sub-routines, program modules, components, data structures, etc., that perform particular tasks or implement particular abstract data types. Moreover, those skilled in the art will appreciate that aspects of the present invention are applicable to other computer system configurations. These other computer system configurations include but are not limited to hand-held devices, multiprocessor systems, microprocessor-based or programmable consumer electronics, minicomputers, mainframe computers, and the like. Aspects of the present invention are also applicable within the context of a distributed computing environment that includes tasks being performed by remote processing devices that are linked through a communications network. In a distributed computing environment, program modules may be located in both local and remote memory storage devices.

In both the presented simplex and duplex embodiments, the Realmation Performers 60 are controllable, animated electronic characters intended for providing an interactive learning and entertainment environment for children. At minimum, each Realmation Performer 60 includes a receiver system 62, 63, 65 and 67, a speech synthesizer 61, a speaker 71, a processing unit 201, and one or more servo motors 69. In response to the receiver system receiving realmation data over the air, the processing unit 201 decodes, interprets, and responds in a manner dictated by the contents of the realmation data. The response of the processing unit 201 may include actuating one or more servo motors 69 and/or providing input to the speech synthesizer 61.

In the duplex embodiment, the Realmation Performers further include one or more sensor devices 70 and a transmitter system 64 and 66. The sensor devices 70 may detect actions such as a child 75 squeezing the hand, covering the eyes, or changing the position of the Realmation Performer 60. By monitoring output signals from the sensors 70, the processing unit 201 may collect status information. Upon receiving a request from the Realmation Control System 10 or by making an autonomous decision, the processing unit 201 can transmit the sensor status information to the Realmation Control System. In response to receiving the sensor status information, the Realmation Control System 10 may alter the animated audio/video presentation in a manner commensurate with the information and/or transmit additional realmation data to the Realmation Performer. For example, in response to the action of a child covering the eyes of the Realmation Performer, the animated audio/video presentation may switch to a game of peek-a-boo.

Thus, in the duplex embodiment, the Realmation Control System engages in bi-directional communication with one or more Realmation Performers. Although the description of this exemplary embodiment of the Realmation Control System portrays a program running on a personal computer and cooperating with another program running on a microprocessor-based communication device, those skilled in the art will recognize that other implementations, such as a single program running on a stand-alone platform, or a distributed computing device equipped with radio communication equipment, may also suffice.

In the simplex embodiment, the Realmation Control System engages in unidirectional communication with one or more Realmation Performers. Although the description of the simplex embodiment of the Realmation Control System portrays a video cassette recorder (VCR) or a cable TV box interfacing with a program running on a microprocessor-based communication device, those skilled in the art will recognize that other implementations, such as direct broadcasting signals, laser disc players, video tape players, computing devices accessing CD-ROM's, etc., may also suffice. Additionally, this embodiment may include integrating a VCR or similar device with a microprocessor-based communication device for operating in a stand-alone configuration.

The communication between the master and slave devices is described in the context of RF signal transmissions formed in accordance with amplitude modulation ("AM") techniques. The RF signals are used to transfer symbolic representations of digital information from one device to another. The RF signals are generated by modulating the amplitude of a carrier signal in a predetermined manner based on the value of a symbolic representation of the digital data. It should be understood that a variety of communication technologies may be utilized for transmitting the information between these devices and that describing the use of AM techniques should not restrict the principles of any aspect of the present invention.

A more detailed description of the simplex and duplex embodiments, in which the invention may be implemented, may be obtained from the commonly assigned patent applications entitled "PROTOCOL FOR A WIRELESS CONTROL SYSTEM," U.S. application Ser. No. 08/795,710 filed on Feb. 4, 1997, and "A SYSTEM AND METHOD FOR CONTROLLING A REMOTE DEVICE," U.S. application Ser. No. 08/794,921 filed on Feb. 4, 1997, which are incorporated herein by reference.

REALMATION PERFORMER

Figure 2:
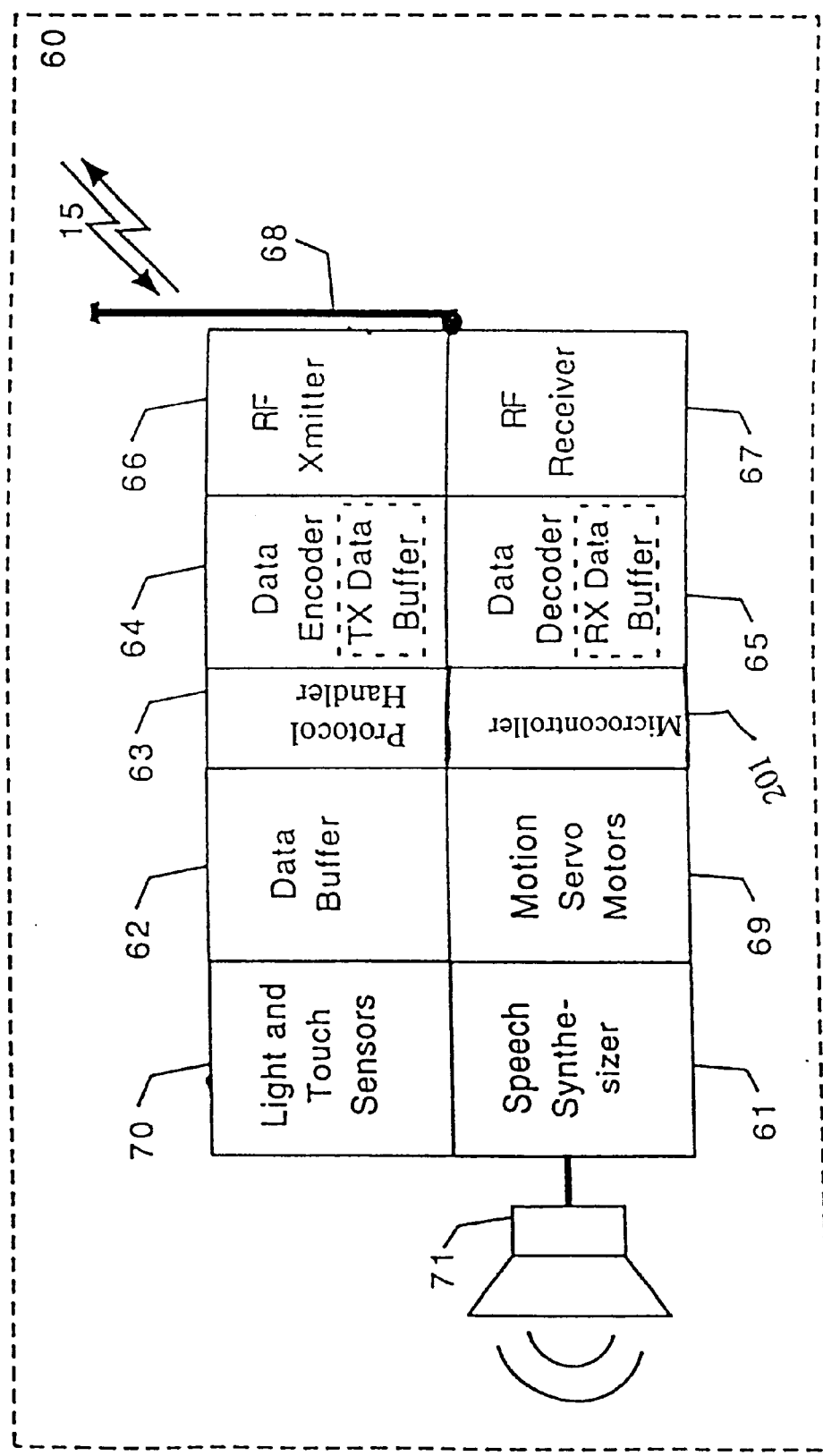
FIG. 2 is a functional block diagram illustrating the various components of the animated electronic character of FIG. 1.

FIG. 2 is a functional block diagram illustrating the various components and/or processes that define a Realmation Performer 60. Each of these components is implemented in hardware, software or a combination of both. Generally, the Realmation Performer includes a microcontroller or other processing unit 201 for retrieving a program from ROM, or some other non-volatile storage media, and executing the instructions of the program. ROM stores data related to movement parameters, as well as instructions for actuating movement of appendages and other movable parts. In addition, the Realmation Performer 60 includes hardware components such as an RF radio receiver 67 and possibly a transmitter 66, an antenna 68, a readable and writable data buffer 62, sensors 70, motion servo motors 69, a speech synthesizer 61, and a speaker 71. The motion servo motors 69, also referred to as servo mechanisms or servos, in conjunction with the use of self-aligning clutches and feedback mechanisms or sensors to create life-like gestures in animated electronic characters will be described in greater detail below in connection with FIGS. 3–10.

The RF receiver 67 receives detected signals from the antenna 68 The RF receiver operates on the received signal by demodulating the carrier and recovering encoded realmation data. Next, the data decoder 65 receives and decodes the encoded realmation data. The protocol handler 63 receives the decoded realmation data output from the decoder 65 and interprets the realmation data. Based on the content of the realmation data, the program sends control signals and/or speech data to the appropriate devices. Thus, if the realmation data contains control information, one or more of the motion servo motors 69 will receive control signals causing them to be actuated. Furthermore, if the realmation data contains speech data, the speech synthesizer 61 will receive the speech data, convert the speech data into audio signals, and then provide the audio signals to the speaker 71. The realmation data may be temporarily stored in data buffer 62 while various processes are being performed.

The Realmation Performer 60 may also include light sensors and touch sensors 70. The sensors 70 may generate status information in response to variations in pressure, light, temperature or other parameters. The Realmation Performer 60 may transmit this status information to the Realmation Control System 10 (shown in FIG. 1). This process includes formatting the status information in protocol handler 63, encoding in the status information in data encoder process 64, modulating a carrier with the encoded status information in RF transmitter 66, and then transmitting the modulated carrier over RF communications path 15 through antenna 68.

SERVO MECHANISM (SERVO) WITH SELF-ALIGNING CLUTCH

With continuing reference to FIGS. 1 and 2 and now turning to FIGS. 3–10, diagrams illustrating a process and devices for driving appendages or other movable parts, namely the arms and neck, of an animated electronic character to create life-like gestures will now be described. For purposes of this discussion, the terms "appendage" and "movable part" will be used interchangeably. It will be appreciated by one skilled in the art that the present invention is not limited to movement of the arms and neck, but can also include movement of legs, eyes, hands, feet, tail, ears, and any other movable part.

This aspect of the present invention provides the basis for an improved technique for moving an appendage of the animated electronic character in a manner that produces a life-like appearance. This goal is accomplished by moving the appendage to different positions over a predetermined period of time. The position of the appendage is monitored and then used to control power to the device so that the appendage moves to a new desired position. Advantageously, the power management feature of the present invention reduces the impact of external forces on the power consumption of the device by carefully controlling the power to the device.

The primary mechanisms of this aspect of the present invention are the servo 69 and feedback mechanism, a self-aligning clutch, and a power manager. Each of these mechanisms will be described in greater detail below with respect to FIGS. 3–10

Referring to FIG. 3, a block diagram illustrating an overview of an exemplary operation for moving an appendage or movable part is shown in accordance with the exemplary embodiment of the present invention. A battery 204 supplies power to a microcontroller 201 and a power amplifier 203. The microcontroller 201 retrieves a program from ROM and executes the instructions of the program. Specifically, the microcontroller 201 receives control signals and/or speech data from the program to articulate movement of an appendage or movable part 214. Moreover, the microcontroller 201 sends the control signals to a servo 200, which includes a motor 206, a gear train 208, and a feedback mechanism or encoder 210, to move the appendage 214 to some new desired position.

When the microcontroller 201 receives a control signal, the microcontroller 201 first makes a determination as to whether a new desired position is equal to a current desired position. If the current and new desired positions are different, the microcontroller 201 sets the current desired position to the new desired position indicated by the control signal. The microcontroller 201 computes an error in the servo position based on the current desired position and the current position obtained from the encoder 210. The encoder 210 will be described in greater detail below in connection with FIG. 8. The error in position is used to compute how to drive the motor 206 in the servo 200—that is, the direction and magnitude of the current supplied to the motor 206. The current desired position and the new desired position are stored within the memory of the microcontroller 201.

Once the computation is made, the microcontroller 201 triggers the power amplifier 203, which in turn, supplies power to the motor 206. Simultaneously, a timer 202, which is implemented within the microcontroller 201, begins running. The timer 202 and the power management aspect of its operation will be described in greater detail with respect to FIGS. 4a and 4b. The motor 206 begins to turn in a designated direction and with an amount of force indicated by the microcontroller 201. Once the motor 206 turns, the gear train 208, which includes a set of combo gears and a partial output gear, also turns. Because the motor 206 has a specific speed specification and torque specification, gear reduction is necessary to obtain the desired speed and torque out of the partial output gear. The gearing within the servo 200 provides this specific gear reduction in the appendage 214 to give a certain look to the appendage movement—that is, the speed of the appendage's motion.

As the partial output gear rotates, the encoder 210 monitors the position of the partial output gear within the gear train 208. Concurrently, a self-aligning clutch 212 rotates, thereby moving the appendage 214. The self-aligning clutch 212 propagates position and maintains the relationship between the motor 206, the partial output gear of the gear train 208, and the appendage 214. Advantageously, the self-aligning clutch 212 prevents damage to the servo when an external force is applied to the appendage 214. The self-aligning clutch 212 will be described in greater detail below with respect to FIGS. 6 and 10.

As the position of the partial output gear changes, the encoder 210 registers the current position of the partial output gear and sends the current position to the microcontroller 201. The microcontroller 201 stores the current servo position, compares the current servo position to the current desired position, determines whether the allocated time for moving to the current desired position has expired by monitoring the timer 202, and continues to drive the motor 206 if the time has not expired and the current servo position does not equal the current desired position. Should the allocated time expire before the current desired position is reached, power to the motor 206 discontinues. By cutting power to the motor at the expiration of a predetermined time period, power consumption of the device is minimized. This feature is especially useful if the child is interfering with the movement of the appendage or movable part.

POWER MANAGEMENT

Because the present invention is suitable for use in a battery-powered system, minimizing power consumption is very important given the expense and inconvenience of having to replace batteries. It will be appreciated by those skilled in the art that the present invention is not limited to power supplied to the motor by a battery, but may also include other mechanical or electrical power sources. Consequently, the present invention employs a power management scheme to reduce the power consumption of the motor in the device, especially in the event of an obstruction being present. Specifically, the motor is not powered when a new desired position is the same as a current desired position regardless of the current position of the encoder. When the new desired position does not match the current desired position, power is applied to the motor, and a timer is started. The motor then tries to move to the new desired position before a timer value expires. When the timer value expires, the power to the motor is turned off regardless of whether the new desired position has been reached. If the new desired position has not been reached, which may be due to the presence of an obstruction, and the timer value has expired, power to the motor is turned off. The timer value is calculated based on the time it takes to move the appendage from one position to another taking into consideration the plush distribution, i.e., the amount of stuffing around the appendage, as well as low battery charge.

FIGS. 4a and 4b are flow diagrams illustrating an exemplary process for managing power in accordance with the exemplary embodiment of the present invention. With respect to FIG. 4a, in the WAIT step 300, an animated electronic toy is in an operative mode, and the microcontroller is waiting to receive a control signal.

When the microcontroller receives a control signal instructing movement of the appendage, a determination is made, in step 302, as to whether the new desired position is equal to the current desired position. If the positions are equal, the "YES" branch is followed to step 300; otherwise, the "NO" branch is followed to step 303. In step 303, the current desired position is set equal to the new desired position. In step 304, a timer is started. The timer value is typically two to four times the time for the full range of motion of the appendage. For example, the timer value for an arm may be two to four times the time it takes for the arm to move from a completely open position to a fully closed position. Once the timer is started, the entire process is repeated beginning at WAIT step 300.

While the microcontroller is receiving control signals and the timer is started as described in connection with FIG. 4a, a second process occurs to actually manage the power consumption of the animated electronic toy. With respect to FIG. 4b, in the WAIT step 306, the animated electronic toy is in an operative mode and can be performing a number of functions, such as moving an appendage to a new desired position, receiving control signals, or waiting for a control signal, and so forth. The position of an appendage is monitored for movement by a feedback sensor approximately 800 times per second during this aspect of the power management system.

In step 308, a determination is made as to whether the timer value has expired. If the timer value has not expired, the "NO" branch is followed to step 310; otherwise, the "YES" branch is followed to the WAIT step 306, in which case, the entire process is repeated. In step 310, a second determination is made as to whether the battery voltage is at an appropriate level. If the battery voltage is at the appropriate level, the "YES" branch is followed to step 314; otherwise, if the battery voltage drops below a certain threshold, the "NO" branch is followed to step 312, in which case, the motor is turned off. The entire process is repeated beginning at WAIT step 306.

In step 314, an error, which is essentially the difference between the current position (from the encoder) and the current desired position, is calculated by the microcontroller. In the exemplary embodiment, a table (not shown) is constructed for obtaining the error based on the relative positions of the appendage. The calculations in the table are based on the dynamics of motion, and a matrix is devised such that by looking up the current position in comparison to the current desired position, data is obtained indicating the direction in which to drive the motor and the magnitude of the current to apply to the motor. With respect to the exemplary embodiment, the table has been incorporated into the microcontroller's built-in memory.

After the error is determined, in step 316, a determination is made as to whether the current position equals the current desired position. If the current position does not equal the current desired position, the "NO" branch is followed to step 318; otherwise, the "YES" branch is followed to step 312. In step 312, the motor is turned off by terminating the power to the motor. The entire process is repeated beginning at WAIT step 306.

However, if the current position is not equal to the current desired position, in step 318, the motor is driven in accordance with the data obtained from the microcontroller. The entire process is repeated beginning at WAIT step 306.

Now turning to FIGS. 5–10, devices representing an arm and a neck of an animated electronic character, both utilizing a servo and a self-aligning clutch, will be described in accordance with the exemplary embodiment of the present invention.

SERVO

Figure 5B:
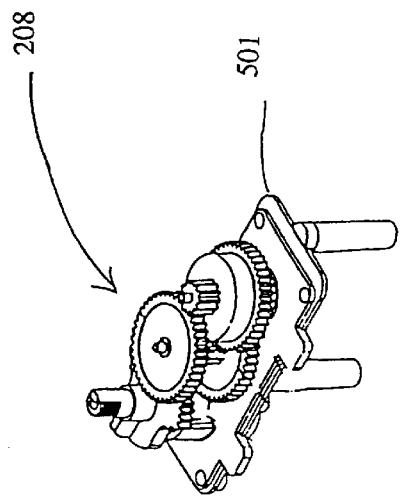
FIG. 5, consisting of FIGS. 5a and 5b, illustrates a gear train within a servo in accordance with an exemplary embodiment of the present invention.
Figure 5A:
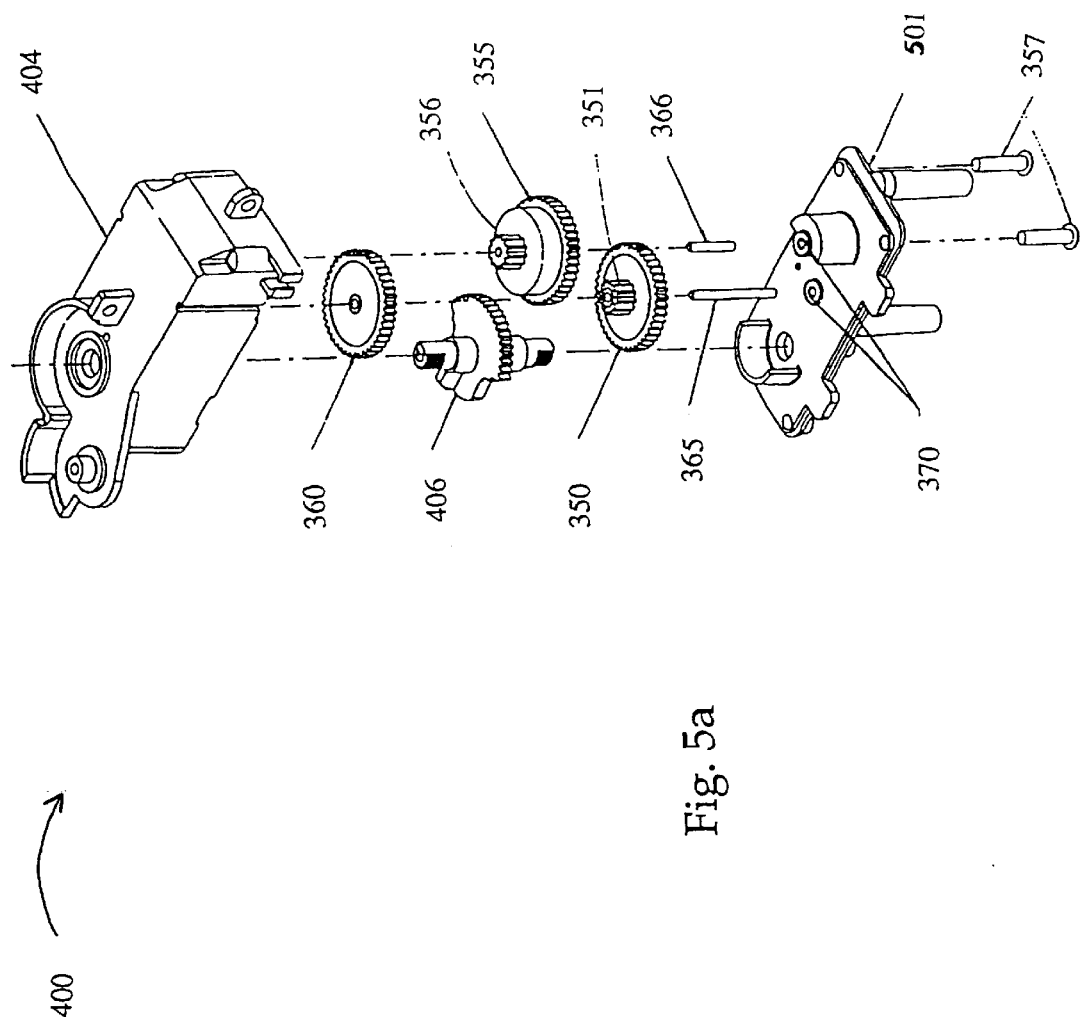

FIG. 5, consisting of FIGS. 5a and 5b, illustrates a gear train that forms a part of a servo in accordance with the exemplary embodiment of the present invention. The set of gears includes a combo gear A 350, a combo gear B 355, a combo gear C 360, and a partial output gear 406, which is a partial gear.

The set of gears are driven by the motor 206 (FIG. 3) and articulate movement of the appendage 214 (FIG. 3). Specifically, a pinion 351 on the combo gear A 350 interfaces with the combo gear B 355 and delivers motion to the combo gear B 355. A pinion 356 on the combo gear B 355 interfaces with the combo gear C 360 and delivers motion to the combo gear C 360. A pinion (not shown) on the combo gear C 360 interfaces with the partial output gear 406 and delivers motion to the partial output gear 406. The partial output gear 406 drives the self-aligning clutch 212 (FIG. 3).

The combo gears 350, 355, 360 and the partial output gear 406 are connected together by gear shafts 365 and 366. The gear shafts are mounted in shaft shoulders 370, which are structurally a part of a motor mounting plate 501. The gear train 208 mounted onto the motor mounting plate 501 within the servo 400 is shown in FIG. 5b. The gear train 208 is housed within a servo cover 404, which is mounted to the motor mounting plate 501 using screws 357.

One purpose of the combo gears 350, 355, 360 and the partial output gear 406 is to provide gear reduction in a compact space. As previously mentioned with respect to FIG. 3, to convert the speed and torque of the motor 206 to the desired speed and torque out of the partial output gear 406, gear reduction is necessary. The combo gears 350, 355, and 360 provide the gear reduction necessary to not only produce a low-cost, low-speed, high-torque servo, but to also give a certain look to the movement of an appendage - that is, the speed of the appendage's motion.

In general, there is a direct correlation between the reduction that is obtained in speed and the amplification that is obtained in torque. In the exemplary embodiment, each combo gear preferably gives a 3.5 to 1 gear reduction. Hence, the gear ratio is 150 to 1—that is, for every 150 turns that a motor pinion 506 (FIG. 8b) makes, the partial output gear 406 turns one time.

Because the appendage 214 (FIG. 3) does not need to rotate a full 360 degrees, an output gear with stops built into it can be used to limit the motion of the appendage 214. Advantageously, the geometry of the geared portion of the output gear gives the appendage 214 the desired amount of angular motion. Moreover, an output gear having full gearing with stops built into it can be used to limit the motion of the appendage 214, but due to space limitations, the partial output gear 406 having a partial gear on it is preferably used. Specifically, the partial output gear 406 occupies less space than the output gear having full gearing, thereby reducing the size of the servo needed and the amount of space the servo occupies.

The appendage 214 (FIG. 3) has this partial output gearing with stops built into it to limit the motion of the appendage 214 in each direction. More importantly, due to the restricted range of the encoder 210, the stops are arranged to ensure that the range of the encoder 210 is not exceeded. These stops built into the partial output gear 406 meet with a stop (not shown) that is built into the underside of the servo cover 404, which does not create any additional forces on the servo.

EXEMPLARY EMBODIMENT UTILIZING A SERVO MECHANISM AND A SELF-ALIGNING CLUTCH—(ARM)

FIG. 6, consisting of FIGS. 6a–6c, illustrates various views of a right arm of an animated electronic character in accordance with the exemplary embodiment of the present invention. Referring to FIG. 6a, a diagram illustrating a view of a servo assembly, which includes a servo 400, a self-aligning clutch 402, and an appendage 424, represents the right arm of an animated electronic character. Because the right and left arms of the animated electronic character are identical in design, only the right arm will be described.

FIG. 6b is a diagram illustrating a top view of the servo assembly of FIG. 6a. The orientation between the appendage 424 and an arm gear 408 on the partial output gear 406 (FIG. 5) of the servo 400 is important for proper alignment. Specifically, points 432 are preferably oriented as illustrated so that when the partial output gear 406 is aligned in its center, neutral position, the partial output gear 406 and the appendage 424 are positioned for correct alignment. The appendage 424 is linked to the partial output gear 406 to allow delivery of restricted motion from the partial output gear 406 to the appendage 424. The arrangement of the appendage 424 and the partial output gear 406 is critical in achieving timed motion. In the exemplary embodiment, a forty-five degree angle between the partial output gear 406 and the appendage 424 provides proper positioning for the arm of the animated electronic character and serves as a reference point, thereby providing a fixed relationship between the appendage 424 and the encoder 210 (FIG. 3).

FIG. 6c is an exploded view of the components that make up the self-aligning clutch 402 and the appendage 424. In FIG. 6c, the servo 400 has a servo cover 404 that is a substantially rectangular casing having a hole 403 on its top side. One purpose of the servo cover 404 is to protect the set of gears (FIG. 5) housed within the servo cover 404. As previously described with respect to FIG. 5, the set of gears includes a combo gear A 350, a combo gear B 355, a combo gear C 360, and a partial output gear 406. The partial output gear 406 has a spline 428 and key 430, which protrude through the hole 403 of the servo cover 404 for engagement with the self-aligning clutch 402. The spline 428 and key 430 combination prevents slippage from occurring between the spline clutch 412 and the partial output gear 406. In addition, the spline 428 assists in distributing the load of the appendage 424 so that all of the load is not on the key 430.

The self-aligning clutch 402 primarily includes a first arm gear 408, which is a coaxial follower link, a torsion spring (flexible link) 414, a spline clutch 412, and a torsion spring cap 418, which is a driver link. An additional element of the self-aligning clutch 402 includes a second arm gear 425, which is connected to the appendage 424. With respect to the arm, the self-aligning clutch 402 is connected to the appendage 424 through a gear stage, namely arm gears 408 and 425. The self-aligning clutch 402 and the appendage 424 are mounted to the servo cover 404 using screws 420. The self-aligning clutch 402 is preferably mounted directly to the partial output gear 406. However, it will be appreciated by those skilled in the art that the present invention is not limited to this arrangement, and hence, the self-aligning clutch may be directly mounted to the appendage 424 instead. Furthermore, it will be appreciated by those skilled in the art that the coupling arrangement between the partial output gear 406 and the self-aligning clutch 402 may be direct or indirect in that there may or may not be gearing between the partial output gear 406 and the self-aligning clutch 402. Advantageously, the self-aligning clutch 402 serves as a safety mechanism that protects the mechanical and electrical systems of the arm from being easily damaged as a result of the user mishandling the arm or interference in arm movement.

The arm gear 408 has a hole 409 located at the wheel's center and a perpendicularly-oriented tab 426 located on the wheel's outer edge and pointing upward. The arm gear 408 is placed on the servo cover 404 such that the spline 428 and key 430 of the partial output gear 406 protrude through the hole 409 of the arm gear 408 while the arm gear 408 remains free-spinning.

The spline clutch 412 is a generally cylindrically-shaped element having a flat top and bottom. A notch 410 is located on its top and an inverse indention (not shown) of the spline 428 and key 430 is located on its bottom. The spline clutch 412 is fitted within the hole 409 of the arm gear 408 and engages the spline 428 and key 430 of the partial output gear 406 such that a lock is created between the spline clutch 412 and the partial output gear 406.

The torsion spring 414, also referred to as a flexible link or a coaxial-flexible coupling, is a coiled spring with two extensions 415 and has a hole 413 located at its center. The torsion spring 414 fits over the spline clutch 412 so that the extensions 415 of the torsion spring 414 come down on each side of the tab 426 of the arm gear 408.

The torsion spring 414 acts as a storage unit. The torsion spring 414 is carefully selected to provide the energy-absorbing/delivery characteristics needed for effectively aiding in the self-alignment of an appendage that is temporarily obstructed by some external force. If input energy resulting from the rotational motion of the torsion spring cap 418 is applied to the torsion spring 414, the torsion spring 414 delivers this energy to the appendage 424 provided there are no obstructions. If the appendage 424 is obstructed and the torsion spring 414 cannot deliver the energy to the appendage 424, the torsion spring 414 flexes and stores this energy for later delivery. The torsion spring 414 may only store a specific amount of energy due to its torsion spring constant. The torsion spring constant controls the force transmitted to the appendage 424. An obstruction only affects the position of the appendage 424 if the limit of the torsion spring 414 is reached.

The torsion spring cap 418 is a disk having a hole 417 located at its center for engagement with screw 420 and having a perpendicularly-oriented tab 419 located on the disk's outer edge and pointing downward. The torsion spring cap 418 also has an inverted notch (not shown) on its bottom side that fits into the notch 410 of the spline clutch 412, thereby creating a lock between the torsion spring cap 418 and the spline clutch 412. The tab 419 of the torsion spring cap 418 is positioned on the inner side of the tab 426 of the arm gear 408 so that the tab 419 of the torsion spring cap 418 is also positioned within the extensions 415 of the torsion spring 414. The torsion spring cap 418 and the spline clutch 412 are physically locked to the partial output gear 406 of the servo 400 using the screw 420.

When a force is applied to the torsion spring cap 418 by the motor via the servo, the torsion spring cap 418 rotates. In turn, the tab 419 of the torsion spring cap 418 transfers the force to one extension 415 of the torsion spring 414. This force is then transferred through the torsion spring 414 to the tab 426 of the arm gear 408, thereby causing the arm gear 408 to rotate.

Figure 7A:
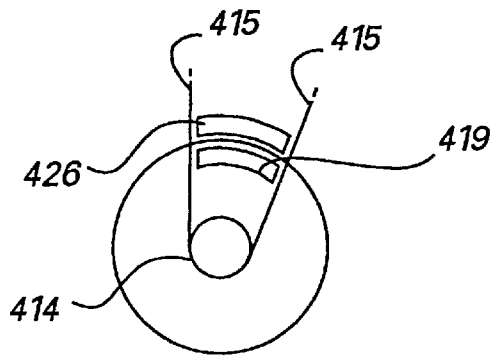
FIG. 7, consisting of FIGS. 7a–7c, illustrates the operation of a torsion spring when an obstruction is applied and removed.
Figure 7B:
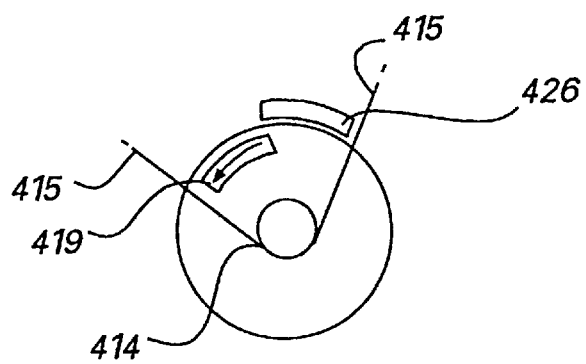
Figure 7C:
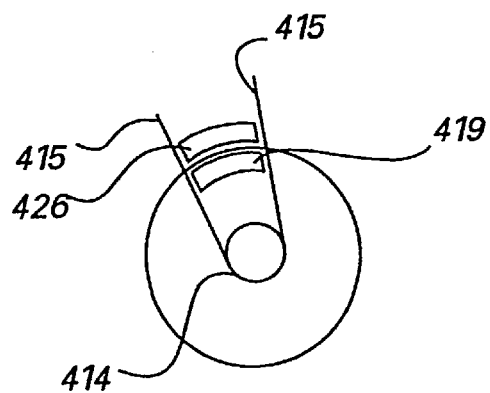

Turning to FIG. 7, consisting of FIGS. 7a–7c, the operation of the torsion spring 414 is illustrated when an obstruction is applied and removed to the appendage 424. When there is no obstruction, the extensions 415 of the torsion spring 414 (flexible link) hold tabs 419 and 426 together in a relative alignment, as shown in FIG. 7a. However, if an obstruction exists, the tabs 419 (driver) and 426 (follower) separate as shown in FIG. 7b. As a result, energy is stored in the torsion spring 414 until the obstruction is removed.

When the obstruction is removed, the torsion spring 414 releases the stored energy, thereby causing the tabs 419 (driver) and 426 (follower) to realign themselves as shown in FIG. 7c.

Turning back to FIG. 6, the arm gear 425 of the appendage 424 is mounted to the servo cover 404 using a washer 422 and the screw 420. The teeth of the arm gears 425 and 408 mesh such that when one arm gear rotates, the other arm gear also rotates. When the arm gear 425 rotates, the appendage 424 moves.

It is critical that the appendage 424 and the partial output gear 406 are locked together in the specific orientation described with respect to FIG. 6b so that the same resting position is achieved and the appendage 424 does not slip.

Because the position of the appendage 424 is not monitored, the self-aligning clutch 402 is designed to cause the appendage 424 to move in direct correlation with the movement of the partial output gear 406 provided there are no external forces preventing the appendage 424 from moving. If there is no obstruction on the appendage 424, the torsion spring 414 does not flex, and no energy is stored. The torsion spring 414 transfers the energy as previously described, and as a result, the appendage 424 moves. If the appendage 424 is obstructed, the torsion spring 414 begins flexing and stores energy as a result of the flexing. When the obstruction is removed, the restoring force of the torsion spring 414 moves the appendage 424 to the position to which it would have moved if there were no obstruction on the appendage 424. Specifically, the appendage moves to the position determined by the partial output gear 406.

The self-aligning clutch 402 performs according to two modes. In the first mode, which is when a motor drives the appendage 424, the link between the partial output gear 406 and one extension of the torsion spring 414 serves as the driver and the link between the appendage 424 and the other extension of the torsion spring 414 serves as the follower. In the second mode, which is when the appendage 424 is moved by an external force, the link between the appendage 424 and one extension of the torsion spring 414 serves as the driver and the link between the partial output gear 406 and the other extension of the torsion spring 414 serves as the follower.

In essence, when the motor drives the appendage 424, if there is no external force on the appendage 424, the torsion spring 414 does not flex and as a consequence, the follower link follows the driver link. If there is an external force on the appendage 424, the follower link is not able to follow the driver link and as a consequence, the torsion spring 414 stores energy. The load or external force on the appendage 424 feels the force that is being applied by the motor. As stated earlier, when the external force is removed from the appendage 424, the restoring force of the torsion spring 414 moves the appendage 424 to the position to which it would have moved if there were no obstruction on the appendage 424. The self-aligning clutch 402 restricts the maximum amount of force that the appendage 424 can apply.

On the other hand, if an external force is applied to the appendage 424, the external force is transmitted through the driver link to the torsion spring 414. The torsion spring 414 transmits the force through the follower link to the partial output gear 406. Because the servo has a high internal inertia due to the gearing, the external force may cause the partial output gear 406 to rotate and/or the torsion spring 414 to flex. When the external force is removed, the energy stored in the torsion spring 414 provides a restoring force to the appendage 424 causing it to move. Hence, the torsion spring 414 controls how much force is transmitted to the appendage 424, as well as how much force is transmitted to the partial output gear 406. Advantageously, the present invention provides the benefit of transmitting a lower force to the servo, thereby protecting it, if a sudden external force is imparted on the appendage 424.

Referring to FIG. 8, consisting of FIGS. 8a and 8b, views illustrating the commutator side or bottom view of a servo assembly is shown in accordance with the exemplary embodiment of the present invention. In FIG. 8a, the servo assembly is fully assembled showing the servo 400, the appendage 424, a feedback mechanism 520, and a motor 500.

Now turning to FIG. 8b, a diagram illustrating an exploded view of each of the components that make up the feedback mechanism 520 and motor 500 of the servo assembly will now be described. The motor mounting plate 501 is mounted to the servo cover 404 of the servo 400. The motor mounting plate 501 contains an hole 503 for protrusion of a shaft 504 of the partial output gear 406. The shaft 504 of the partial output gear 406 engages the feedback mechanism or sensor 520.

The purpose of the feedback sensor 520 is to read the rotational motion of the partial output gear 406 and to provide position data to the microcontroller 201 (FIG. 3). The feedback sensor 520 is attached to the partial output gear 406. Since the partial output gear 406 is connected to the motor 500 through the combo gears 350, 355, 360, when the motor 500 moves, the partial output gear 406 moves and the feedback sensor 520 detects the motion. It is important to note that because of the self-aligning feature of the clutch, it is sufficient to monitor the position of the partial output gear 406 as opposed to monitoring the position of the appendage 424. If it was necessary to monitor the position of the appendage 424, the cost of the system would increase because of the need for an additional feedback sensor. Moreover, because a clutch is a non-linear element and the algorithms that address this non-linearity are very complex, and in turn, would require a much more expensive microcontroller/processing unit, it is more advantageous to monitor the position of the partial output gear 406 as opposed to monitoring the position of the appendage 424. It is the self-aligning feature of the clutch that provides the benefit of such monitoring.

The feedback sensor 520 includes an encoder board 530, a cap switch 525, and an encoder cover 522. The encoder board 530 is directly mounted to the motor mounting plate 501. The encoder board 530 contains four traces, one trace being a common trace and three traces being signal traces. The traces are specially encoded using a gray coding scheme. Generally defined, the gray coding scheme is a modified binary code in which sequential numbers are represented by expressions that differ only in one bit to minimize errors. For example, the gray coding scheme may produce a pattern, such as X000, X001, X011, X010, X110, X100, X101, and X111, where X is the common trace bit and the 1s and 0s are the signal trace bits. The encoder board 530 is locked in position so that the traces on the encoder board 530 are in fixed relation to the partial output gear 406 to measure the various positions of the partial output gear 406.

The plastic cap switch 525 is a sub-assembly having a commutator (not shown) and four fingers 527, which are a part of a commutator. The commutator is a conductive metal that is connected to the bottom side of the cap switch 525. The cap switch 525 has a spline/key feature (not shown) located on its bottom side that mates with the partial output gear 406, thereby locking the commutator in a fixed orientation.

The four fingers 527 protrude from the cap switch 525 and are arranged at 90° angles. The fingers 527 make contact with the surface of the encoder board 530. Specifically, each finger 527 is capable of contacting a trace on the encoder board 530. When the motor 500 turns, thereby causing the appendage 424 to move, the fingers 527 sweep across the traces of the encoder board. Based on the gray coding scheme, the fingers 527 connect signal traces to the common trace. According to the pattern described above, the X is always in contact with a finger, the 1s may indicate that a finger is on a signal trace, and the 0s may indicate that a finger is not on a signal trace. As the fingers 527 sweep across the encoder board 530, eight combinations indicate the position of the appendage 424. The encoder board 530 in combination with the fingers 527 on the cap switch 525 serve as a mechanical switch for monitoring the position of the partial output gear 406, which in turn, provides feedback as to the position of the appendage 424. The encoder cover 522 serves as a protective covering for the fingers 527 of the cap switch 525 and the encoder board 530. The feedback sensor 520 is mounted to the posts 536 located on the motor mounting plate 501 using screws 515, as shown in FIG. 8a.

The motor 500, serving as an input device for the servo assembly, drives the set of gears (FIG. 5) in the servo 400. The motor 500 is positioned on the motor mounting plate 501 by placing a pinion gear 506, which is connected to a shaft 507 located on the bottom edge of the motor 500, into the hole 509 of the motor mounting plate 501. The pinion gear 506 of the motor 500 engages the set of gears in the servo 400 and delivers gear motion to the set of gears. The motor 500 is secured to the motor mounting plate 501 by placing a motor cap 510 and a motor gasket 505 over the motor 500 and by mounting the motor cap 510 to the posts 535 using the screws 515.

In summary, the motor, the partial output gear, and the appendage typically have the same relationship. The self-aligning clutch transmits torque and stores energy when an external force is applied. When the external force is removed, the self-aligning clutch allows the energy that has been stored to act in a restoring fashion, thereby moving the appendage. The torsion spring characteristics control how much force is transmitted to the appendage and the partial output gear.

Without the use of the self-aligning clutch, the position of the appendage must be continuously monitored to ensure that when an external force is removed from the appendage, the appendage moves to the position that it would have moved to had no external force been present. Lack of the self-aligning clutch greatly impacts the ability to create life-like gestures, as well as the quality of the gestures. One advantage of the present invention is that when an obstruction is removed, the motor, the partial output gear, and the appendage automatically establish a relative alignment.

ALTERNATIVE EMBODIMENT UTILIZING A SERVO MECHANISM AND A SELF-ALIGNING CLUTCH—(NECK)

Figure 9A:
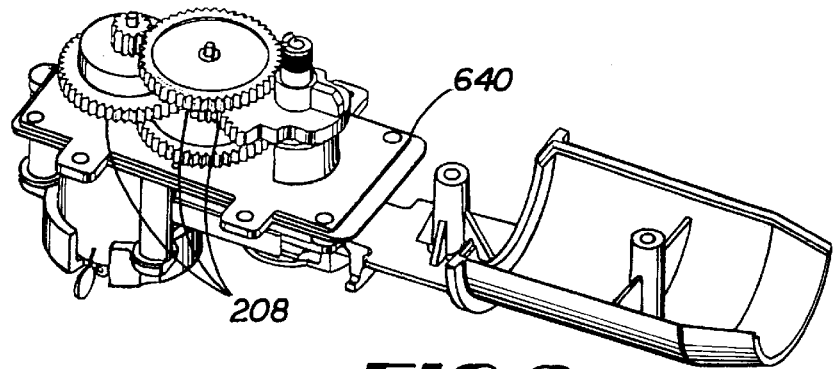
FIG. 9, consisting of FIGS. 9a and 9b, illustrates a gear train within a servo in accordance with an exemplary embodiment of the present invention.
Figure 9B:
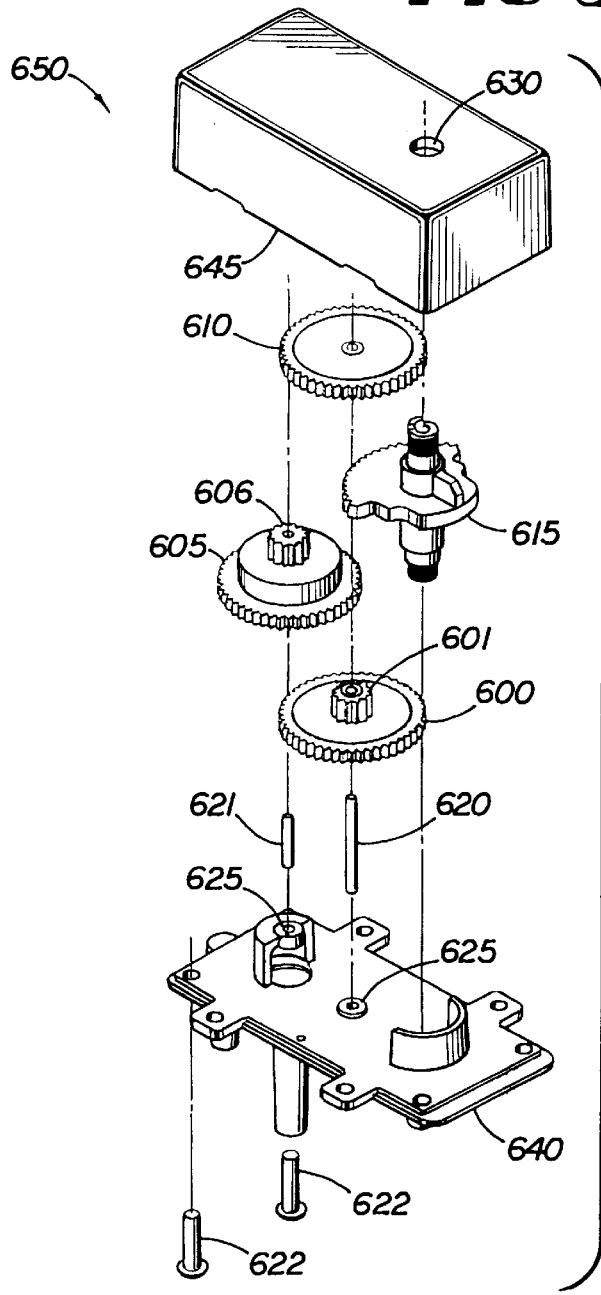

FIG. 9, consisting of FIGS. 9a and 9b, illustrates a gear train within a servo in accordance with the exemplary embodiment of the present invention. The servo 650 is used in connection with a neck of an animated electronic character. The servo 650 is essentially the same as the servo 400 (FIG. 5) in that the arrangement and functionality of the gears are the same. The primary differences between the servo 400 for the arm and the servo 650 for the neck are the size of the gears, the servo covers, and motor mounting plates. Because the gears are larger in the alternative embodiment, each combo gear gives a higher gear reduction, namely 4 to 1 gear reduction. Hence, the gear ratio is 240 to 1—that is, for every 240 turns that a motor pinion makes, the partial output gear turns one time.

In FIG. 9a, the set of gears includes a combo gear A 600, a combo gear B 605, a combo gear C 610, and a partial output gear 615. The set of gears are driven by the motor 206 (FIG. 3) and articulate movement of the movable part 214 (FIG. 3). Specifically, a pinion 601 on the combo gear A 600 interfaces with the combo gear B 605 and delivers motion to the combo gear B 605. A pinion 606 on the combo gear B 605 interfaces with the combo gear C 610 and delivers motion to the combo gear C 610. A pinion (not shown) on the combo gear C 610 interfaces with the partial output gear 615 and delivers motion to the partial output gear 615. The partial output gear 615 drives the movable part 214.

The combo gears 600, 605, 610 and the partial output gear 615 are connected together by gear shafts 620 and 621. The gear shafts are mounted onto shaft shoulders 625, which are structurally a part of a motor mounting plate 640. The gear train 208 mounted onto the motor mounting plate 640 within the servo 650 is shown in FIG. 9b. The gear train 208 is housed within a servo cover 645, which is mounted to the motor mounting plate 640 using screws 622. The servo cover 645 has a hole 630 for protrusion of the partial output gear 615.

The combo gears 600, 605, 610 and the partial output gear 615 provide the gear reduction necessary to obtain the desired speed and torque out of the partial output gear 615 due to the speed and torque specifications of the motor 206 (FIG. 3). The partial output gear 615 has a partial gear on it to give the movable part the desired amount of angular motion, thereby producing realistic movement of the movable part.

FIG. 10, consisting of FIGS. 10a–10c, illustrates various views of a servo assembly for a neck of an animated electronic character. Referring to FIG. 10a, a diagram illustrating a view of the servo assembly, which includes a servo 650, a self-aligning clutch 700, a neck 775 and a motor 740 is shown. If the neck 775 and the self-aligning clutch 700 are removed from the servo assembly, a feedback mechanism or sensor 654 becomes visible, as shown in FIG. 10b.

FIG. 10c illustrating an exploded view of the components that make up the self-aligning clutch 700, the feedback sensor 654, the motor 740, and the neck 775 will now be described.

In contrast to FIG. 6, no gear stage is utilized between the neck 775 and the self-aligning clutch 700. Consequently, the connection between the neck 775 and the self-aligning clutch 700 is direct. In addition, the neck 775 and the self-aligning clutch 700 are connected to the commutator side of the servo 650, whereas in FIG. 6, the arm and self-aligning clutch are mounted to the top of the servo cover.

The self-aligning clutch 700 includes a torsion spring (flexible link) 760, a torsion spring cap 765, which is a driver link, and a bracket 777, which is a coaxial follower link. The bracket 777 is attached to the neck 775 and has a perpendicularly-oriented, T-shaped tab 776 located closest to the neck 775. The self-aligning clutch 700 and the neck 775 are mounted to the feedback sensor 654, which is mounted to the motor mounting plate 640 using screws 755. As previously mentioned, one advantage of the self-aligning clutch is it protects the mechanical and electrical systems of an appendage or movable part from being easily damaged as a result of the user mishandling the appendage or interference of the appendage movement.

The torsion spring 760, also referred to as a flexible link, is a coiled spring with two L-shaped extensions 762 and has a hole 761 located at its center. The torsion spring 760 fits on top of the bracket 777 so that the L-shaped extensions 762 of the torsion spring 760 come down on each side of the tab 776, which points in an upward direction. It will be appreciated by those skilled in the art that the present invention is not limited to a coiled spring, but may also include any flexible link that is suitable for storing energy for later delivery.

The torsion spring 760 serves the same purpose as the torsion spring 414, as previously described in connection with FIG. 6. The torsion spring 760 provides the energy-absorbing/delivery characteristics needed for effectively aiding in the self-alignment of the neck. If input energy resulting from the rotational motion of the torsion spring cap 765 is applied to the torsion spring 760, the torsion spring 760 delivers this energy to the neck 775 provided there are no obstructions. If the neck 775 is obstructed and the torsion spring 760 cannot deliver the energy to the neck 775, the torsion spring 760 stores this energy for later delivery.

The torsion spring cap 765 is a disk having a hole 778 located at its center for engagement with the screw 755 and having a perpendicularly-oriented, T-shaped tab 766 located on the disk's outer edge and pointing downward. The torsion spring cap 765 also has a cylinder 767 protruding from the hole 778 of its bottom side for insertion into the hole 761 of the torsion spring 760 and the hole 799 of the bracket 777. The tab 766 of the torsion spring cap 765 is positioned on the inner side of the tab 776 of the bracket 777 so that the tab 766 of the torsion spring cap 765 is also positioned within the L-shaped extensions 762 of the torsion spring 760.

When there is no obstruction, the L-shaped extensions 762 of the torsion spring 760 hold tabs 776 and 766 together in a relative alignment. However, if an obstruction exists, the tabs 776 and 766 separate. As a result, energy is stored in the torsion spring 760 until the obstruction is removed. When the obstruction is removed, the torsion spring 760 releases the stored energy, thereby causing the tabs 776 and 766 to realign themselves.

The motor mounting plate 640 contains a hole 735 for protrusion of a shaft 711 of the partial output gear 615. The shaft 711 of the partial output gear 615 engages the feedback mechanism or sensor 654. The purpose of the feedback sensor 654 is to read the rotational motion of the partial output gear 615 and to provide position data to the microcontroller 201 (FIG. 3). The feedback sensor 654 is attached to the partial output gear 615. Since the partial output gear 615 is connected to the motor 740 through the combo gears 600, 605, 610, when the motor 740 moves, the partial output gear 615 moves and the feedback sensor 654 detects the motion. It is important to note that because of the self-aligning feature of the clutch, it is sufficient to monitor the position of the partial output gear 654 as opposed to monitoring the position of the neck 775. If it was necessary to monitor the position of the neck 775, the cost of the system would increase because of the need for an additional feedback sensor. Moreover, because a clutch is a non-linear element and the algorithms that address this non-linearity are very complex, and in turn, would require a much more expensive microcontroller/processing unit, it is more advantageous to monitor the position of the partial output gear 654 as opposed to monitoring the position of the neck 775.

The feedback sensor 654 is structurally and functionally the same as the feedback sensor 520, as previously described with respect to FIG. 8. The feedback sensor 654 includes an encoder board 785, a cap switch 770 having four fingers 786, and a encoder cover 780. The encoder board 785 is mounted directly to the motor mounting plate 640. The encoder board 785 also contains the gray coding scheme, as previously described. The encoder board 785 is locked in position so that traces on the encoder board 785 are in fixed relation to the partial output gear 615 to measure the various positions of the partial output gear 615.

The cap switch 770 has a spline/key feature (not shown) located on its bottom side that mates with the partial output gear 615, thereby locking the cap switch 770 in a fixed orientation to the partial output gear 615.

The fingers 786 make contact with the surface of the encoder board 785. The encoder board 785 in combination with the fingers 786 on the cap switch 770 serve as a mechanical switch for monitoring the position of the partial output gear 615, which in turn, provides feedback as to the position of the neck 775. The encoder cover 780 serves as a protective covering for the fingers 786 of the cap switch 770 and the encoder board 785. The feedback sensor 654 is mounted to the posts 725 located on the motor mounting plate 640 using screws 755, as shown in FIG. 10*b*.

The motor 740 functions the same as the motor 500 (FIG. 8) and is mounted to the motor mounting plate 640 in the same manner described in FIG. 8. Specifically, the motor 740, serving as an input device for the servo assembly, drives the set of gears (FIG. 9) in the servo 650. The motor 740 is secured to the motor mounting plate 640 by placing a motor cap 750 and a motor gasket 745 over the motor 740 and by mounting the motor cap 750 to the posts 715 using the screws 755.

In summary, the self-aligning clutch 700 is designed to cause the neck 775 to move in direct correlation with the movement of the partial output gear 615 provided there are no external forces preventing the neck 775 from moving. If there is no obstruction on the neck 775, the torsion spring 760 does not flex, and no energy is stored. The torsion spring 760 transfers the energy as previously described, and as a result, the neck 775 moves. If the neck 775 is obstructed, the torsion spring 760 begins flexing and stores energy due to the flexing. When the obstruction is removed, the restoring force of the torsion spring 760 moves the neck 775 to the position that it would have moved if there were no obstruction on the neck 775, thereby moving the neck to the position of the partial output gear 615.

Specifically, when the motor drives the neck 775, if there is no external force on the neck 775, the torsion spring 760 does not flex and as a consequence, the follower link follows the driver link. If there is an external force on the neck 775, the follower link is not able to follow the driver link and as a consequence, the torsion spring 760 stores energy. The load or external force on the neck 775 feels the force that is being applied by the motor. When the external force is removed from the neck 775, the restoring force of the torsion spring 760 moves the neck 775 to the position to which it would have moved if there were no obstruction on the neck 775. The self-aligning clutch 700 restricts the maximum amount of forces that the neck 775 can apply.

On the other hand, if an external force is applied to the neck 775, the external force is transmitted through the driver link to the torsion spring 760. The torsion spring 760 transmits the force through the follower link to the partial output gear 615. Because the servo has a high internal inertia due to the gearing, the external force may cause the partial output gear 615 to rotate and/or the torsion spring 760 to flex. When the external force is removed, the energy stored in the torsion spring 760 provides a restoring force to the neck 775 causing it to move. Hence, the torsion spring 760 controls how much force is transmitted to the neck 775, as well as how much force is transmitted to the partial output gear 615. Advantageously, the present invention provides the benefit of transmitting a lower force to the servo, thereby protecting it, if a sudden external force is imparted on the neck 775.

CONCLUSION

The present invention provides the basis for an improved technique for moving appendages and other movable parts of an animated electronic character to create life-like gestures. This goal is accomplished by moving an appendage to different positions over a predetermined period of time. The gearing within the device provides the specific gear reduction needed to give a certain look to the appendage movement. In addition, the present invention reduces the impact of external forces on the power consumption of the device by carefully controlling the power to the device. Furthermore, the present invention employs a clutching mechanism, namely a self-aligning clutch, for restoring the position of an appendage after an external force had been removed. As a result of employing the self-aligning clutch, damage to the servo is prevented when an external force is applied to the appendage or movable part.

Alternative embodiments will become apparent to those skilled in the art to which the present invention pertains without departing from its spirit and scope. Accordingly, the scope of the present invention is defined by the appended claims rather than the foregoing description.

What is claimed is:

1. An apparatus for moving and monitoring the position of an appendage in a mechanical character, comprising:

a processor operable for transmitting control signals defining movement commands for the appendage and receiving encoded electric feedback signals representing position information for the appendage;

a motor operative for receiving the control signals from the processor and for rotationally driving a driver link in response to the control signals;

a self-aligning clutch comprising a flexible link rotationally coupling the driver link to an output gear coupled to the appendage, the flexible link operable for maintaining rotational alignment between the driver link and the output gear when the appendage is not obstructed, and flexing to allow rotational misalignment between the driver link and the output gear when the appendage is obstructed, the flexible link further operable for storing energy resulting from rotational misalignment between the driver link and the output gear when the appendage is obstructed and returning the stored energy to realign the driver link and the output gear when the appendage becomes unobstructed; and a feedback circuit including;

an encoder board that is rotationally stationary with respect to the output gear, the encoder board defining a conductive common trace and a plurality of conductive signal traces; and a conductive commutator electrically connected to the common trace and rotationally coupled to the output gear, the commutator defining a plurality of fingers in contact with the encoder board and configured to cause the signal traces of the encoder board to produce the encoded electric feedback signals as the conductive fingers sweep over the encoder board.

2. The apparatus of claim 1, wherein the flexible link comprises a helical spring having a first end positioned to engage the output gear and a second end positioned to engage the driver link.

3. The apparatus of claim 1, further comprising a power source and a voltage detector providing the processor with an indication of voltage produced by the power source, wherein the processor is further operative for controlling the power consumption of the motor by:

(a) detecting a first control signal for movement of the output gear from a current desired position to a new desired position within a predetermined time period;

(b) determining whether the new desired position is different from the current desired position;

(c) determining whether the voltage level of the power source is below a specific threshold;

(d) powering the motor if the new desired position is different from the current desired position and the voltage level of the power source is not below the specific threshold; and (e) terminating the power to the motor upon the occurrence of the first of 1) the output gear reaching the current desired position, 2) the predetermined time period expiring, or 3) the voltage of the power source is below the specific threshold.

4. The apparatus of claim 3, wherein the processor is further configured for:

monitoring a current position of the output gear;

comparing the current position of the output gear to the current desired position; and determining whether the current position is the same as the current desired position before performing the step of terminating the power to the motor.

5. The apparatus of claim 3, wherein the processor is further configured for repeating steps (a) through (e) for each additional control signal after the first control signal.

6. The apparatus of claim 1, wherein the processor is further operative for:

detecting a control signal defining a desired position for the output gear;

determining a current position of the output gear based on the feedback signals;

calculating a timer value for driving the output gear from the current position to the desired position;

initiating power to the drive gear in response to the control signal; and terminating power to the output gear if the timer value expires before the output gear has reached the desired position.

* * * * *